United States Patent Office 3,819,799
Patented June 25, 1974

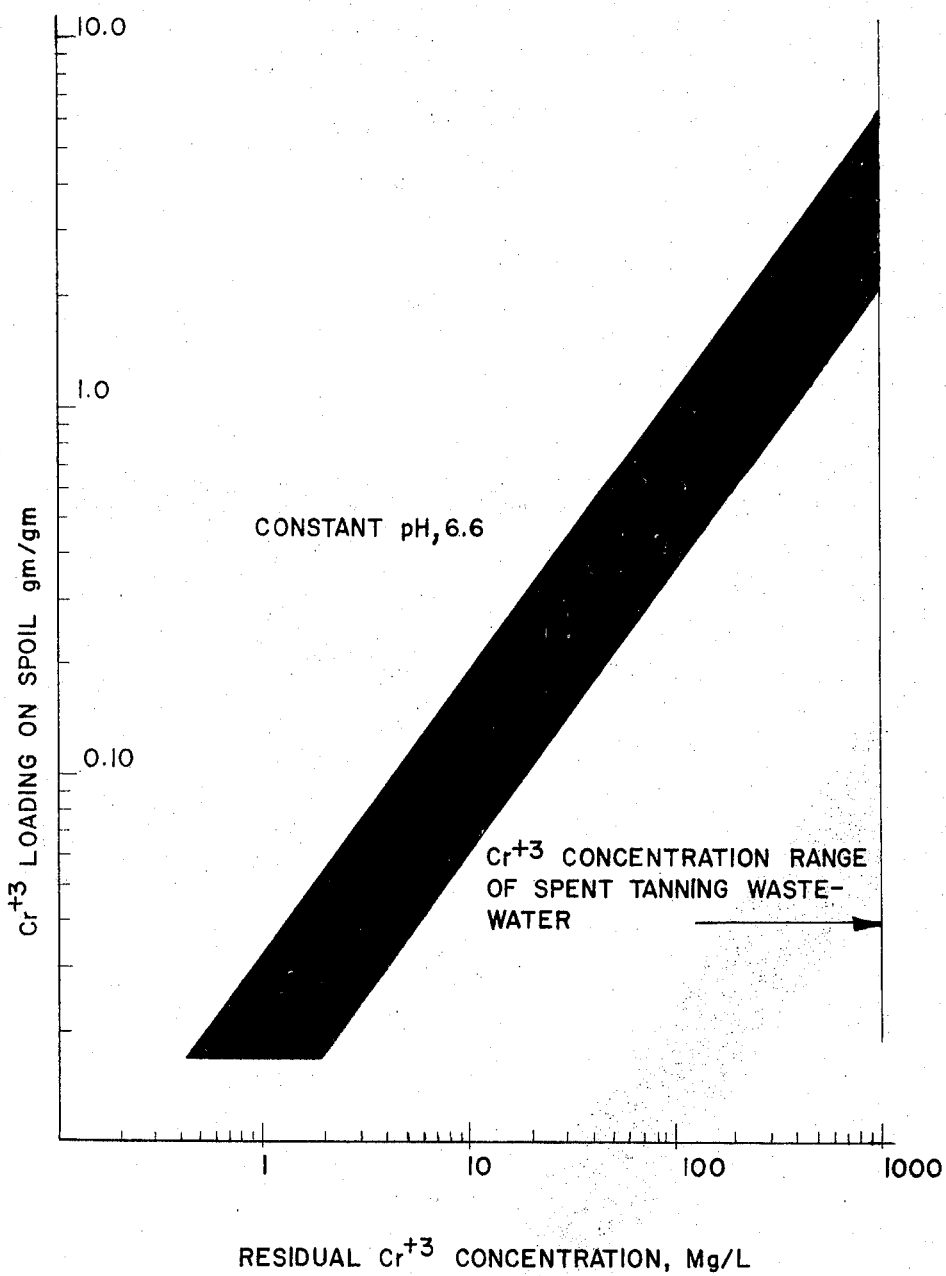

3,819,799
CHROMIUM EXTRACTION
Donald E. Matschke, Hinsdale, Alfred M. Tenny, Homewood, and Jack K. Gregersen, Hinsdale, Ill., assignors to Bauer Engineering, Inc., and Tenco Hydro/Aerosciences, Inc., both of Chicago, Ill., fractional part interest to each
Filed May 11, 1972, Ser. No. 252,210
Int. Cl. C01g 37/12
U.S. Cl. 423—53                                5 Claims

ABSTRACT OF THE DISCLOSURE

Organic soils are used to remove trivalent chromium values from solutions containing the same.

---

This invention relates to extraction of chromium from solutions thereof.

Chromium is, of course, a valuable metal employed for various applications. For example, the plating of metal with chromium is widely practiced and chrome plated metal finds considerable use in the automotive industry. Likewise, chromium is used in the tanning industry to tan leather. For this purpose an acid solution of chromium is used, and, depending on the particular tanning operation, approximately two-thirds of the chromium remains with the leather with the remaining one-third being discharged as a waste stream. Customarily this waste stream is sent to settling tanks or lagoons where it is held for varying periods of time to permit the solids present therein to settle out. Also sent to the settling tanks or lagoons are other tannery waste streams such as those from hide washing operations, their removing operations and the like. The solids or sludge from the settlers or lagoons is periodically dredged and used as land fill or stockpiled to to form a spoil-pile or bank which is organic in nature and similar to natural subsoils but with less clay content. The supernatant liquid is then discharged to a sewer or perhaps directly into a nearby body of water. This supernatant liquid contains appreciable amounts of chromium which, when discharged into a natural body of water, causes pollution problems. Also, the loss of chromium in this manner represents an economic loss.

It is a principal object of this invention to provide a process whereby chromium present in waste streams from operations using chromium can be recovered.

It is a more specific object of this invention to provide a process for recovery of chromium from waste streams from leather tanning operations.

In accordance with the present invention it has been discovered that chromium, principally trivalent chromium, can be efficiently recovered from solutions containing the same by contacting the chromium-containing solution with an organic soil. Particularly advantageous for use in accordance with this invention are "spoil-pile" soils which are the solid sludges accumulated by settling of the waste streams from leather tanning operations; these "spoil-pile" soils or sludges frequently contain relatively high concentrations of precipitated chromium hydroxide which are potentially recoverable and reuseable.

In practice the organic soil is milled so as to render it granular or friable in nature and to break up large lumps. The particle size of the soil employed is not critical. The granular soil is then added to a chromium-containing liquor, preferably with some agitation, so as to achieve dispersion of the soil throughout the liquor. This adsorption operation can be carried out at ambient temperatures for periods ranging from about 15 minutes up to 24 hours or more. During the adsorption operation the pH of the chomium-containing liquor is maintained at a value above 6.5. After a sufficient period of contact the mixture is permitted to set in a quiescent state whereupon the solid organic soil settles out and the chromium depleted liquor can then be decanted. Filtration or centrifugation can be employed, if desired, but generally simple decantation is sufficient.

The organic soil resulting from the adsorption operation is loaded with chromium which can then be recovered therefrom by contacting the chromium-laden soil with an acidic leaching liquid such as sulfuric acid, hydrochloric acid and the like. The acidic leach solution containing chromium can thereafter be employed for tanning of leather.

The amount of chromium adsorbed by a given amount of soil is governed by equilibrium considerations. Thus, for maximum recovery of chromium from a waste liquor, a relatively large excess of organic soil is employed for adsorption. The figure of the drawing represents an equilibrium "adsorption isotherm" for soluble chromium using a typical spoil-pile adsorbent at a pH of about 6.6 and an ambient temperature of 20–25° C. This typical spoil-pile adsorbent had a total solids content measured at 105° C. of 58%, a volatile solids content measured at 600° C. of 35%, a calcium content of 18% (dry basis) and a chromium$^{+++}$ content of 5.5 to 7% (dry basis).

The following examples show the ability of organic soils to extract chromium values from leather tanning waste streams. In these examples the organic soil adsorbent employed was that described above.

EXAMPLE I

In this example approximately 8 grams of soil were added to 100 milliliters of a bate, pickle, tan liquor at a pH of 6.6 and which contained 6800 milligrams per liter of trivalent chromium. After stirring about 20 hours the supernatant was removed by filtration. The filtrate had a pH of 6.6 and a chrome concentration of 7.4 milligrams per liter. This represented a chrome removal of approximately 84.7 milligrams chromium per gram of soil.

EXAMPLE II

In this example approximately 8 grams of soil were added to 200 milliliters of bate, pickle, tan liquor. Samples were maintained at a pH of 6.6 and were removed over 24 hours and analyzed for chrome. After 15 minutes, the concentration of chrome had dropped from approximately 6800 milligrams per liter to 4650 milligrams per liter. After four hours the value was 209 milligrams per liter chromium and at the end of 23 hours the chromium value was 8.2 milligrams per liter.

EXAMPLE III

Three runs were conducted using approximately 1, 3 and 5 grams of soil in contact with 100 milliliters of a bate, pickle, tan liquor containing 6800 milligrams of chromium per liter. The contact time was 72 hours. After contact with the soil the solids were removed by filtration through Whatman #42 filter paper. Table I shows the results of these runs and another run in which the pH of the liquor was first raised to 6.

TABLE I

| Wt. soil (gm.) | Starting pH | Filtrate, pH | Cr in filtrate, mg./l. | Adsorption, mg. Cr/gm. soil |
|---|---|---|---|---|
| 1 | 3.7 | 4.5 | 5,714 | 108 |
| 3 | 3.7 | 6.5 | 38 | 225 |
| 5 | 3.7 | 6.8 | 5 | 136 |
| 3 | 6.0 | 6.6 | 16 | 226 |

EXAMPLE IV

Five runs were conducted of which two runs consisted of pH adjustment only of the bate, pickle, tan liquor with sodium hydroxide and calcium hydroxide respectively. The remaining three runs employed 100 milliliters of bate, pickle, tan liquor and varying amounts of soil adsorbent. Contact times were all 24 hours with mild agitation produced by a shaker table. The bate, pickle, tan liquor had an initial chromium$^{+++}$ concentration of 6800 milligrams per liter at a pH of 3.7. Prior to analysis each sample container was removed from agitation and allowed to experience quiescent settling. The supernatant from each sample was analyzed for chromium$^{+++}$ as was a 0.45 micron millipore filter aliquot of the supernatant. The results are presented in Table II.

A comparison of the settled and filtered supernatants of the bate, pickle, tan liquor samples exposed to only pH adjustment as contrasted with exposure to the soil adsorbent with simultaneous pH adjustment illustrates that the chromium removal effected by the soil material is significantly more extensive than can be effected by mere solubility considerations.

TABLE II

| Wt. soil (gm.) | Final pH | Cr in Supernatant, mg./l | Cr in Filtrate, mg./l. | Adsorption mg. Cr/gm. soil |
|---|---|---|---|---|
| None, pH adj. with NaOH | 6.6 | 882 | 206 | |
| None, pH adj. with Ca(OH)$_2$ | 6.6 | 1,240 | 136 | |
| 0.70 | 6.6 | 1,000 | 68.0 | 830 |
| 4.54 | 6.6 | 109 | 41.7 | 148 |
| 10.5 | 6.6 | 36.1 | 15.8 | 64.5 |

The discovery forming the basis of this invention can be advantageously utilized for removing chromium values from various solutions containing the same. The organic soil adsorbents employed in accordance with the invention are inexpensive and readily available at sites where it is desired to recover chromium such as, for example, from waste streams from chromium plating operations, from leather tanning operations and the like. By employing the present invention, chromium contamination of lakes and streams can be alleviated.

Those modifications and equivalents which fall within the spirit of the invention are to be considered a part thereof.

What is claimed is:

1. A process for extracting trivalent chromium from solutions thereof which comprises contacting at a pH above about 6.5 a chromium-containing solution with an organic soil which is the chromium-bearing sludge resulting from the collecting and settling of the waste streams from leather tanning operations and then separating the chromium-enriched organic soil from said solution.

2. A process in accordance with claim 1 wherein the chromium-containing solution is contacted with an organic soil in a controlled pH environment of about 6.5 to 7.5.

3. A process in accordance with claim 1 wherein after separating the chromium-enriched soil from said solution it is leached with an acidic leaching agent to remove chrome therefrom.

4. A process in accordance with claim 1 wherein the chromium-containing solution which is contacted with the organic soil comprises a chromium-containing waste stream from a leather tanning operation.

5. A process in accordance with claim 1 wherein the chromium-containing solution consists of an acid leach solution from a chromium ore.

References Cited
UNITED STATES PATENTS

| | | | |
|---|---|---|---|
| 2,110,187 | 3/1938 | Williams | 423—57 |
| 3,314,747 | 4/1967 | Carlin | 423—58 |
| 3,371,034 | 2/1968 | Richards | 423—58 |
| 3,399,958 | 9/1968 | Brown | 423—121 |
| 3,493,328 | 2/1970 | Nieuwenhuis | 423—57 |
| 3,728,273 | 4/1973 | Bruen et al. | 423—58 |

HERBERT T. CARTER, Primary Examiner

U.S. Cl. X.R.

210—38, 39

UNITED STATES PATENT OFFICE
CERTIFICATE OF CORRECTION

Patent No. 3,819,799      Dated June 25, 1974

Inventor(s) DONALD E. MATSCHKE, ALFRED M. TENNY and JACK K. GREGERSEN

It is certified that error appears in the above-identified patent and that said Letters Patent are hereby corrected as shown below:

Column 1, line 34, "their" should be -- hair -- line 37, delete "to", second occurrence

Column 2, line 32, "approximately 8 grams of soil were" should be -- 8 grams of the dried spoil-pile were --

Signed and sealed this 17th day of September 1974.

(SEAL)
Attest:

McCOY M. GIBSON JR.
Attesting Officer

C. MARSHALL DANN
Commissioner of Patents